United States Patent
Christensen et al.

(10) Patent No.: US 7,447,568 B2
(45) Date of Patent: Nov. 4, 2008

(54) ELECTRIC POWER NETWORK

(75) Inventors: Hans Christian Christensen, Copenhagen (DK); Lars Gertmar, Västerås (SE); Sture Lindahl, Lund (SE); Juhani Mantere, Tuusula (FI); Erik Koldby Nielsen, Odense (DK); Leif-Erik Wraae, Tommerup (DK)

(73) Assignee: ABB Research Ltd., Zürich (CH)

( * ) Notice: Subject to any disclaimer, the term of this patent is extended or adjusted under 35 U.S.C. 154(b) by 0 days.

(21) Appl. No.: 10/584,211

(22) PCT Filed: Dec. 22, 2004

(86) PCT No.: PCT/SE2004/002003

§ 371 (c)(1), (2), (4) Date: May 21, 2007

(87) PCT Pub. No.: WO2005/062438

PCT Pub. Date: Jul. 7, 2005

(65) Prior Publication Data

US 2007/0217105 A1    Sep. 20, 2007

(30) Foreign Application Priority Data

Dec. 23, 2003   (SE) .................... 0303574

(51) Int. Cl.
*G05D 11/00* (2006.01)
(52) U.S. Cl. .................... 700/298; 361/18
(58) Field of Classification Search .......... 700/286, 700/287, 292, 293, 298; 361/18, 20, 21, 361/55, 56, 59; 703/18
See application file for complete search history.

(56) References Cited

U.S. PATENT DOCUMENTS

| | | | | |
|---|---|---|---|---|
| 4,336,490 A | * | 6/1982 | Lewis | 323/305 |
| 5,530,338 A | * | 6/1996 | Beckwith | 323/255 |
| 5,646,512 A | * | 7/1997 | Beckwith | 323/257 |
| 5,689,395 A | | 11/1997 | Duffy et al. | |
| 5,747,972 A | * | 5/1998 | Baretich et al. | 323/223 |
| 5,867,356 A | | 2/1999 | Duggal et al. | |
| 5,900,723 A | * | 5/1999 | Rostron | 323/210 |
| 6,411,067 B1 | | 6/2002 | Björklund | |
| 6,512,966 B2 | | 1/2003 | Lof et al. | |
| 6,577,108 B2 | | 6/2003 | Hubert et al. | |

FOREIGN PATENT DOCUMENTS

EP    0474 186 A2    3/1992

* cited by examiner

*Primary Examiner*—Albert DeCady
*Assistant Examiner*—Chad Rapp
(74) *Attorney, Agent, or Firm*—Venable LLP; Eric J. Franklin (57) ABSTRACT

A device for controlling at a fault condition. An apparatus is connected by a connection line to a grid point of a transmission net in an electric power network. A voltage raising apparatus includes a first branch connected to the grid point including a switching element and a second branch including a current resisting means. The voltage raising apparatus includes a computer for signal processing of a sensed fault condition on the network and for affecting the operation of the switching element such that on a fault condition at least part of the current is diverted through the voltage raising apparatus and for evaluation of further actions.

15 Claims, 8 Drawing Sheets

ELECTRIC POWER NETWORK

CROSS-REFERENCE TO RELATED APPLICATIONS

This application claims priority to Swedish patent application 0303574-8 filed 23 Dec. 2003 and is the national phase under 35 U.S.C. § 371 of PCT/SE2004/002003 filed 22 Dec. 2004.

TECHNICAL FIELD

The present invention concerns an electric power network. Such a network may include any combination of an ac and a dc net. More precisely the invention concerns a network for high power transmission of electric power. Especially the network comprises power generation and utilization of electric power. The network comprises a transmission net and plurality of apparatus connected in grid points of the net. These apparatus comprises equipment for producing electric energy, for consuming electric energy and for controlling the network. Such apparatus may also comprise combinations of such equipment. In particular the invention concerns a device and a method for controlling an apparatus of such a network. By controlling in this context should be understood to affect the performance of the apparatus. The invention also concerns a computer program product for executing the method.

Among equipment contained in the expression apparatus are rotating electric machines. Such an electric rotating machine comprises a rotor and a stator which are rotatable in relation to each other to perform a movable magnetic field. An electric rotating machine is thereby reckoned as a transformer of mechanical energy into electric energy and vice versa. The first embodiment is a generator and the second embodiment is a motor. An apparatus according to the invention also comprises a transformer for transforming electric power between part of the network or other networks. Especially the apparatus comprises equipment containing power electronics for controlling the network. Such equipment comprises static VAR compensators, static converters, capacitor banks, reactors and the like.

BACKGROUND OF THE INVENTION

A power network comprises a plurality of interconnected producers and consumers of electric power. A producer comprises an electric power generating equipment such as a generator and a consumer comprises a power consuming equipment such as a motor or a furnace. The network also comprises a transmission net, which is the media in which the electric power is transported from a producer to a consumer. A fault condition, which may be caused by a sudden current current rush, in such a network will result in a voltage drop in the transmission net. Apparatus connected to the net all have safety equipment which senses the voltage in the grid point and on sensing a voltage drop rapidly disconnects the apparatus from the transmission net.

For a rotating electric machine a sudden rush of current would instantaneously increase the heat generation in the electric circuit. This increase in heat would harm the machine in a matter of less than part of a second. Therefore a rotating electric machine is protected for a sudden current rush by a control means such as a switchgear, which immediately disconnects the machine from the connection to a grid point. Thus the electric circuit will be open such that no current can flow. A rotating electric machine is often connected or integrated with a mechanical machine. Thus by supplying a mechanical force such as hydro power, wind power or the power from a combustion engine to the mechanical machine the electric machine is rotated and thus producing power. In this embodiment the rotating electric machine is a generator.

A system of a rotating electric machine integrated with a mechanical machine can be seen as a mechanical circuit, a magnetic circuit and an electric circuit interacting with each other. Thus by disconnecting one of those circuits the other two have to be disconnected too. While the electric power can be disconnected in matter of seconds the mechanical power cannot be disconnected that fast. Often there is a large moment of inertia incorporated in the mechanical machine, which must be affected to stop the machine. Thus there must be equipment present, like a brake, to make possible to stop the rotating electric machine. Also the magnetic circuit involves a moment of inertia and the saturation of the iron core of the stator or rotor or if there is present a permanent magnet. In such cases the still revolving electric machine will produce electric energy which could produce partial discharges harming the insulation of the electric winding of the rotating electric machine. Also there are the mechanical power supply, like wind flow or water flow which cannot be diverted or stopped at all or at least not that fast.

Whether the rotating electric machine is a generator, thus producing electric power or a motor thus producing mechanical power the disconnection of the electric circuit affect the two other circuits in a way that a plurality of safety arrangements have to be present in both cases.

A transformer can be seen as a first electric circuit, a magnetic circuit and a second electric circuit interconnected. A sudden rush of current would also in this case lead to an instant increase in heat in the electric circuits and thus be harmful. Both the electric circuit can be instantaneous disconnected from each of their connections. Depending on when in matter of milliseconds this disconnection takes place there might be a magnetically stored energy hidden in the transformer core. This implies that also transformers must have a plurality of safety arrangements in order to protect the windings of the transformer.

All apparatus for controlling the network, such as power electronics, reactors and capacitor banks, have inherent stored energy which must be taken care of in a situation of over current and disconnection. Also in these situations there are safety arrangement for disconnecting the apparatus from the net and protection against the stored energy. High voltage capacitor banks normally have their capacitor units individually fused. Capacitor bank feeders are normally protected by fused contactors or switches. In the case of circuit breakers, phase fault and earth fault protection are provided.

The starting and stopping of constant speed asynchronous induction motors, as required by the manufacturing or plant process, is the most common control function in any industry. For this reason, a fused switch combined with a contactor and some minor protective and auxiliary relaying is, in some parts of the world, given the name "motor controller". Similarly, an assembly of such units is likewise given the name "Motor Control Centre" or MCC. Starting and stopping may only require manual operation, however, MCC are normally under the management of a computer, which may execute the start and stop actions without interference from operators. Sometimes the process operator may wish to overrule the computer and start or stop motors manually, providing it is safe for the process to do so.

Motor control may be more sophisticated and include the variation of speed, traditionally done with DC motors. More and more often the control is effected by adjusting the frequency to either cage-type induction motors. For larger units the control is effected by synchronous motors all the way up to 40 MW for large compressor drives. For such large ASD (adjustable speed drives) it is essential to recognize that the speed controller (or frequency converter) is in integral part of the motor package, where all parts are finely tuned to each other. The interface with process control is basically only to provide a protocol for an input signal to the frequency converter in order to increase or reduce speed.

Synchronous motors resemble generators and therefore some generators protection schemes may also be used for synchronous motors.

Whether at low or medium voltage, a motor circuit supplied either via circuit breaker or a fused contactor. This is the "last" over current decide in a series of over current devises. There are two types of protection required for a motor circuit. First of all, the motor and feeder cables are protected against a short circuit by the circuit breaker or fuses. Secondly, protection is required to prevent an increase in load causing excessive current and heating in the motor, cable, and associated switchgear controlgear.

Transformer protective relaying is first of all provided to limit the consequences of faults and failures such as a short circuit inside the transformer and in the connecting leads. Such faults are very rare, but if such failure should occur, it may develop very fast, such that the protection cannot save the transformer from permanent damages. A fast disconnection will, however, limit the results preventing a devastating fire or explosion. Large transformers have further protective arrangements such as redundant or duplicated short circuit protection, under impedance and differential protection. Delayed overvoltage protection is provided for transformers with a risk of elevated voltage, which can cause core magnetic saturation and overheating damages if permitted to last.

High voltage capacitor banks normally have their capacitor units individually fused. Capacitor bank feeders are normally protected by fused contactors or switches. In the case of circuit breakers, phase fault and earth fault protection are provided.

From U.S. Pat. No. 6,411,067 (Björkman) is previously known a voltage source converters operating either as back-to-back stations or as parallel static var compensators. The object of the converter arrangement is to provide a device for controlling the flow of electric power in a transmission line carrying alternate current.

It is further known from the document that in an electric transmission system it is of great importance and value to be able to rapidly and precisely control the flow of electric power so as to adapt the power flow to varying load conditions and to achieve a stable and predictable power flow despite disturbances of different kinds. Different types of devices have been proposed and put into operation for achieving this control of power flow. A device commonly used for this purpose is the so-called Unified Power Flow Controller (UPFC). The UPFC consists of two AC/DC voltage source converters designated as exciter and booster, respectively. The DC sides of both converters are connected to a common capacitor providing a DC voltage support for the converter operation and functioning as an energy storage means.

The AC side of the booster inserts a synchronous AC voltage of controllable magnitude and phase angle in series with the transmission line via a series transformer. The AC side of the exciter is connected in parallel to the transmission line via a transformer where a current of controllable magnitude and power factor angle is injected into or absorbed from the transmission line. By means of a UPFC, the active and the reactive power flow through the transmission line can be controlled independently of each other. The main task of the exciter is to control the DC link voltage and to keep it on the reference value by exchanging the specific amount of active power with the transmission line. The secondary task of the exciter is to compensate reactive power as a var compensator so as to keep the line voltage on a constant level.

It is thereby known in order to provide a device highly effective for controlling the flow of electric power in a transmission line carrying alternating current, which device can be manufactured at relatively low costs. Such a device comprises a first VSC (VSC=Voltage Source Converter) connected to the transmission line at a first point and a second VSC connected to the transmission line at a second point, said first and second VSC having their DC sides connected to a common capacitor unit, wherein the device further comprises a by-pass switch connected to the transmission line between said first point and said second point in parallel with the first and second VSC so that the first and second VSC will operate as a back-to-back station when the by-pass switch is open and as two parallel static var compensators when the by-pass switch is closed.

When the by-pass switch of the device is open and the VSC operate as a back-to-back station, a powerful control of the flow of electric power in the transmission line can be achieved. During this first mode of operation, the phase, the frequency as well as the magnitude of the alternating voltage in the transmission line can be controlled by means of the device, and the active and reactive power can be controlled independently of each other. When the by-pass switch of the device is closed the VSC operate as two parallel static var compensators. During this second mode of operation, the device indirectly controls the transmission line voltage, and thereby the transmitted electric power, by generating reactive power for, or absorbing reactive power from, the transmission system. The device is preferably operated in said first mode during time periods when the flow of electric power in the transmission line has to be controlled to a large extent, whereas the device is preferably switched over to said second mode during time periods when only minor regulations or no regulations at all of the power flow are required. When the device is operated in said second mode, the power losses are lower than during operation in said first mode.

From U.S. Pat. No. 6,512,966 (Löf et al) is previously known a method for enhancing a commercial value of a unit of electric power produced by a renewable power production facility. The object of the method is to enhance commercial value of electrical power produced from a renewable energy power production facility The document further states the wind power is a "natural" power production source that instinctively should be regarded as an optimum source of energy for producing electric power. Wind power does not require the burning of fossil fuels, does not result in nuclear waste by-products, does not require the channeling of water sources, and does not otherwise disturb the environment. On the other hand, wind power is a variable (stochastic) power generation source, thus not offering power production facilities the type of control that the power production and grid facility would like to have in producing commercially reliable power. To address this variability issue, even the early pioneers of wind power attempted to identify ways to "store" wind generated electric power in times of excess, so as to later compensate for times when there are lulls in the wind.

In the early days, wind energy plants were generally isolated from one another and provided small scale generation facilities. Through a variety of experiments wind energy plants have generally evolved and now a common theme is to group a number of wind turbines together so as to form farms that can generate up to tens of megawatts via the aggregation of smaller plants that produce slightly above only one megawatt each.

The method thus comprises identifying a predetermined amount of power predicted to be produced from the renewable power production facility at a predetermined future time and converting the predetermined power from the renewable power production facility to a unit of premier power for application to a power grid at a standard frequency.

From U.S. Pat. No. 6,577,108 (Hubert et al) is known a voltage regulation of a utility power network including generation systems, transmission systems and distribution systems serving loads. Especially the regulation is related to a system for controlling the transfer of energy to and from a utility power network. The object of the regulation system is to compensate for power shortfalls or voltage instability problems on the network.

The system therefore includes a controller that controls a reactive power compensation device to deliver, for a first period of time reactive power to the utility network. In a second period of time, following the first period of time the controller controls the reactive power compensation device to provide reactive power to the network at a predetermined level. The power compensation device has a steady-state power delivery characteristics.

Having detected and reacted to a change of a predetermined magnitude in the nominal voltage on the utility power network by increasing injected power to a level that is as much as N (N>1) times higher than the maximum steady-state power delivery characteristic of the compensation device, power injection of the compensating device can be purposefully and gradually reduced to the maximum steady-state value so as not to include a transient response by the network that could result in voltage instability and/or other undesirable events.

The voltage regulation provides an approach for operating a reactive power compensation device in an overload mode for a maximum period of time without incurring an abrupt, step-like change in inverter current at the time the overload capability of the compensating device has been expended, thereby forcing the compensating device's current to be at or below a specified level. Thus, as noted, the invention reduces the possibility of undesirable transients (e.g., ringing oscillations) in the utility power network. Furthermore, a substantially optimum ramp down profile can be determined on the basis of the characteristic impedance of the network.

During the first period of time, the compensation device provides real power and reactive power to the utility power network. After the second period of time, the reactive power from the compensation device is non-discontinuously decreased to the steady-state power delivery characteristic. The factor N is generally determined on the basis of a transient thermal capacity characteristic (e.g., a 1% rating) of the compensation device. The second period of time is determined on the basis of the ability of the compensation device to absorb thermal energy. The ramp down profile may be determined on the basis of the characteristic impedance of the network. The characteristic impedance of the network may be determined using known characteristics of the network. Alternatively, the reactive power compensation device can apply a stimulus to the network and a response measured.

As show in the prior it is previously known systems and devices for protecting devices connected to a net, converters for controlling the electric flow, economic aspect to control a network and voltage regulation devices for compensation of power shortfalls or voltage instability. For the function of a power network itself there is a desire to keep the power production alive and the power transmission as well as the power consumption maintained. In cases of a fault condition in the net, however, all apparatus have a tendency to disconnect themselves from the net thereby leaving the net out of transmission and out of control. There is thus a long time need to provide a network that will still be alive and controllable in a fault condition.

There are regulations on national levels that demands for a wind farm to stay connected with at least some reactive and active power input to the grid during faults and to resume power production when faults are cleared. Further there are international specifications of wind farms connected to a transmission network. These specifications specify that offshore wind farms—like other major production plants—should not lose stability or trip at short-circuits in the network disconnected by the primary network protection. Said in a popular way, the turbines must be able to survive a short dead time (~100 milliseconds) and resume production when the fault has been disconnected and the voltage starts to return."

Wind turbines for producing electric power from the wind are even more delicate in this matter than other electric power producers. The wind cannot be cut off but is there for making electric power at every instant when a wind is present. If thus a wind mill is disconnected from the net the possible energy production will be lost. The wind will just pass the wind turbine whether it is propelling or not. There is thus great economical interests to keep the wind power production even in harsh conditions. Thus there is a need to have the wind turbines active even in a fault condition on the net. As the wind is a non storable energy every second counts.

SUMMARY OF THE INVENTION

A primary object of the present invention is to provide a method and a device for controlling the power transmission in a power network during a fault condition. A secondary object of the present invention is to provide on detecting a fault condition a temporary delay for making possible a further investigation of the nature of the fault condition and thereby providing a respite for the decision of a correct action to be taken while still the network is in a operational condition.

This object is achieved according to the invention by a device, a network, a method and a computer program product according to the present invention.

In a first aspect of the invention the objects are achieved by introducing at a fault condition a voltage raising means between an apparatus and its connection to a grid point in a power network. As a response to a sensed voltage drop in the grid point such voltage raising means or a transient booster will prevent the normal protecting devices to trig (trip) and there would be a short period of time during which a correct action to be taken is evaluated. In a first embodiment of the invention the voltage raising means comprises a switch in parallel with a resistor element. Under normal condition the switch is closed and the current is passing without resistance. In a fault condition the switch is open and the current is diverted trough the resistor element. Such resistor element would immediately slow down a current flow and thus maintaining a raised voltage towards the connected apparatus. As a result the apparatus will still be connected to the net for producing or for consuming power at a reduced rate.

The time incidence when the voltage raising means according to the invention is activated is crucial. The voltage raising means must be activated long before the tripping devices of the apparatus is activated. Long before in this context is in the range of a tenth of a second. Therefore the voltage raising means comprises means for receiving signals from sensors close to the position of the fault and may comprise means for receive information from other control means of the network.

A voltage raising element in the form of a resistor element would rapidly increase in temperature but still introduce a temporary delay, a short period of time, during which a decision for a further action to be taken is evaluated. The further action to be taken could be any of a plurality of actions possible in a range from an introduction of a second voltage raising means or the rearrangement of a Y-Δ connection to a complete disconnection of the apparatus. In a second embodiment of the invention the voltage raising means comprises a disconnecting switch in parallel with an autotransformer, which may comprise a resistor element. The voltage raising means may also involve generating, motoring and phase-compensating capabilities. In a further embodiment of the invention the voltage raising means comprises a current diversion means comprising power electronics.

Most apparatus such as a motor or a generator are connected to a grid point of a transmission net via a circuit breaker. A sudden drop of voltage at the grid point caused by a fault condition in the power network will cause an immediate rush of current towards the grid point. Such a current rush will cause all protection means and tripping devices to rapidly disconnect the apparatus connected. It is only a matter of milliseconds which of a plurality of protection means will act first. All of these protection means has the function of protecting the apparatus—not the power network. As discussed a sudden disconnection of an apparatus could harm the apparatus itself due to an inherent moment of inertia. This moment of inertia is normally in balance with a thrust and a load. If thus either the thrust or the load is disconnected the inherent forces in the apparatus are unbalanced which may harm the apparatus. It is therefore an important part of the invention to realize that a current diversion leading to a raise in the voltage sensed by the apparatus not only protect the apparatus but also contribute to the upholding of a power transfer in the network.

The invention is especially applicable for networks with a plurality of phases and which experiences a fault condition which is unsymmetrical. Thus when only one of three phases experiences a fault condition the connections may easily be re-arranged such that a power transmission still is at hand, however, in a reduced state.

As mentioned before the apparatus may comprise a combination or a plurality of apparatus connected to a grid point. In these cases the inventive voltage raising means may be introduced once for all apparatus or for in combinations for a single or combination of apparatus. Especially when power electronics is involved the voltage raising means must be introduced downstream the power electronics.

In a second aspect of the invention the objects are achieved by a method for raising the voltage between a power producer and a connecting grid point to the transmission net experiencing a fault condition in order to introduce a respite for decision on further actions to be taken. During this respite the transmission of power between the apparatus and the grid point will still remain in, however, at a reduced rate.

In sensing a fault condition in the network the current is immediately diverted from the normal current flow to affect a voltage raising means under a first period of time. During this first period of time the there is an evaluation of the next action to be taken. A plurality of information concerning the condition of the apparatus as well as the network is continuously collected and evaluated. During this first period of time the nature of the fault condition is evaluated and the action for a next period of time is decided. At the end of the first period of time a second action is exercised. This second action may be any of a plurality of re-arrangements for maintaining the power flow at a reduced rate. Such action comprises the connection of a second resistor element, the connection of a autotransformer, or a Y-• re-arrangement of the rotating machine or transformer. The second action is a starting point of a second period of time during which is evaluated a further action to be taken. The method thus comprises diverting the current from the non-resisting connection to a parallel branch containing a voltage raising means, sensing a plurality of parameters of the network, and evaluation of a further action to be taken.

In a third aspect of the invention the objects are achieved by a computer program product for controlling a voltage raising means in accordance with the method described. The voltage raising means thus contains computer means and memory means for storing the computer program product. The computer program product comprises instructions for the computer to evaluate the method presented above. The computer means comprises organs for receiving signals from sensing devices and from other information means in the network. The computer program therefore involves instructions for the computer to evaluate the information sources and to calculate at least one proposal for an action to be taken.

By boosting the voltage during a short period of time, a transient, there will be a respite for making a more appropriate decision of a correct action to be taken. By introducing such a transient booster according to the present invention it is possible to make best use of available fault voltage levels and allowable current levels in motors, generators and power electronics that are dispersed with connections to transmission, distribution and collection lines. Especially in adjustable speed wind turbines in parks interconnected to mains for large-scale distributed power production the transient booster is particularly useful for fault handling for high efficiency and fungible electric power generation.

Transient Boosters for Electric Power equipment like Rotating Machines, Power Compensators, and Power Electronic Converters are described, to be used to introduce a respite in order to reduce consequences from lowered voltage and transmission capability during faults.

Transient Boosters improve aspects associated with angular speed and voltage quantities: electromagnetic forces, phasors, and the like, in rotating machines used as electrical generators or motors and associated with compensators and interconnection line voltages. They make best use of available fault voltage levels and allowable current levels in motors, generators and power electronics in as wide areas of applications as generation, transmission and utilization of electrical power.

Transient Boosters provide solutions for low cost wind turbine parks and their interconnections that handle a large amount of power, with highest availability and cost-effectiveness, without generating excessive amounts of heat during normal operation but easily refined into a cost effective design which utilizes temporarily rated components to increase the voltage in the vicinity of power engineering equipment like Rotating Machines, Power Compensators, and Power Electronic Converters.

Distributed power generation's interconnections' transmission stability is temporarily improved and a respite will be gotten by immediately introducing a ((resistive,) temporarily rated,) voltage boosting component to increase the voltage in the vicinity of a generator thus causing appreciated attenuation or dissipation of electrical energy, otherwise accelerating the turbine and stressing stability of interconnections as well as mechanics.

Respite is interpreted firstly as a short period of rest or relief from something difficult or unpleasant, and secondly as a short time when something bad stops happening, so that the situation is temporarily better.

The background to use the word respite in power generation, transmission and utilization for this patent application is that considerable efforts are made to utilize new energy sources like so-called "new renewables", especially wind power and solar energy for electrical power generation. Those sources are to a large extent available where mankind avoids to settle down. They are furthermore not simply interchangeable sources without risks for deficiencies of energy. This means that other energy sources are needed to fill in lacking power. All this taken together means that interconnections between generators and loads will be stressed.

At a fault condition there will be needs for respite to survey the situation based on automatic communications within parts of seconds. Modern digital communications systems are characterized by transaction time period amounting to parts of seconds or a second. Modern wide-spread electric power transmission and distribution as well as renewables' power collection system are characterized by a transit from one state to another state or in worst case a collapse in the range of seconds.

Cost-effective hardware, rapidly engaged at disturbances in the electric power network, is beneficial to make a first remedy in a right direction when a fault happens and give a respite to communicate and to survey the situation. The invention introduces equipment that is temporarily engaged as elements in series with generators, preferably at voltages up to 1 kV to be cost-effective. The invention is in general to be applied at HV as series links or in HV transmission lines interconnecting but it is more cost-effective to put the series elements at LV.

The invention introduces a respite to measure essential parameters like angular, speed and voltage quantities during short-circuit faults and to communicate these for an automatic, computer-based survey of the situation when needed. The invention change focus from utilities' definition of worst case for a wind turbine and deals with wind turbines that are slightly above worst case. It facilitates a reactive power support from sources that are at reasonable voltage and give the electric power network a respite to respond and recover.

Recently, wind turbines have received increased attention as environmentally safe and relatively inexpensive alternative energy sources. With this growing interest, considerable efforts have been made to develop wind turbines that are reliable and efficient, whereby availability of wind power parks after faults emerges as essential on a regional level in system operations of interconnections, like transmission, distribution and collection lines, which form fungible electrical power networks.

Generally, turbines are connected to rotating electrical machines that convert between different forms of mechanical power from various sources. Some of these sources are better controllable and storable, e.g., steam from fossil or nuclear fuel, hydro-power from dams, and the like, while other forms, e.g., energy from the wind, are less controllable and non-storable even wasted completely after devastating faults disconnecting wind power parks with a potential domino-effect on a regional level in system operations of interconnections. All turbines are slow in control themselves but turbines thrusting generators with adjustable speed power electronic converters provide electric power generation control superior to traditional constant speed power plants.

Interconnections are used to transmit electrical power from generators to loads—i.e., motors, and the like—but are exposed to short-circuit faults, whereby voltage level is reduced, e.g., by excessive reactive currents, and, from that low voltage level, causing reduced capability of transmission, with surplus of power in turbine equipment and lack of power to motor loads as consequences.

BRIEF DESCRIPTION OF THE DRAWINGS

Other features and advantages of the present invention will become more apparent to a person skilled in the art from the following detailed description in conjunction with the appended drawings in which.

DETAILED DESCRIPTION OF THE INVENTION

Figure 1:
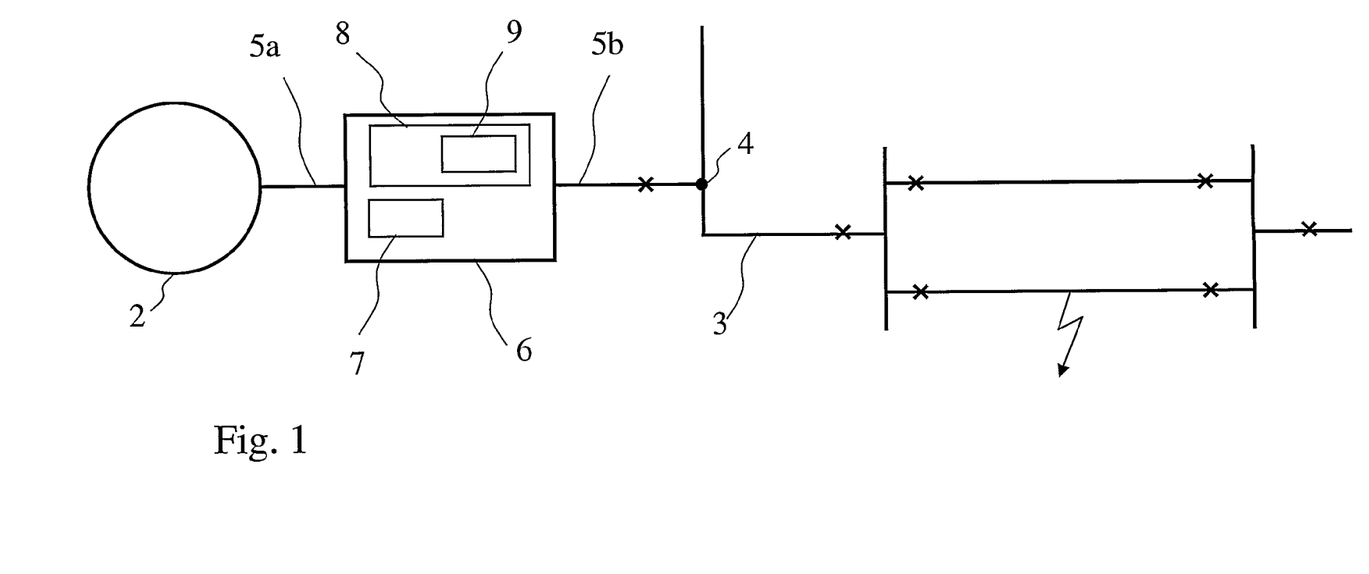
FIG. 1 is a brief sketch of a part of a power network according to the invention experiencing a fault condition.

The part of a power network 1 shown in FIG. 1 comprises an apparatus 2 for producing or consuming electric energy to or from the network connected to a transmission net 3 at a grid point 4 by a connection line 5. A control device 6 according to the invention is positioned in the connection line. The control device comprises a voltage raising means 7, computer means 8 and memory means 9 for storing data and a computer program product. A plurality of switchgears is comprised in the network in positions marked with an X. The power network sketched in the figure may be a single phase network as well as a network with a plurality of phases. Most common is a three phase power network.

Figure 2:
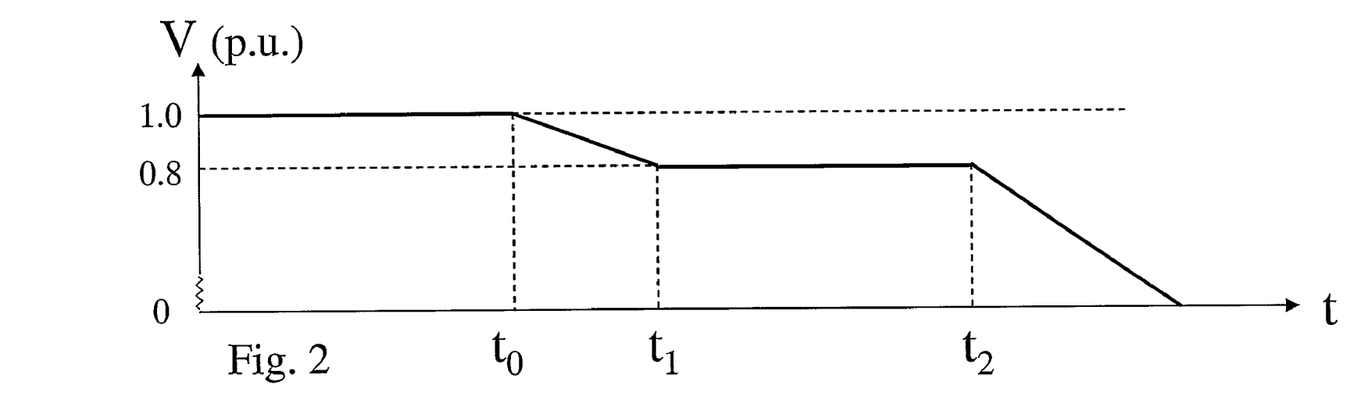
FIG. 2 is a diagram of voltage by time in a grid position.

In the diagram according to FIG. 2 the time event of a fault condition is shown for a point representing the grid point 4. When a fault condition occur at $t_0$ the voltage dropped from a nominal voltage of 1 pu to a level shown in the figure of 0.8 pu. Due to an action time $t_2-t_1$ of a first switchgear the connecting line is disconnected at $t_2$. The example shown in FIG. 2 is only an example of a possible situation in a power network.

Figure 3:
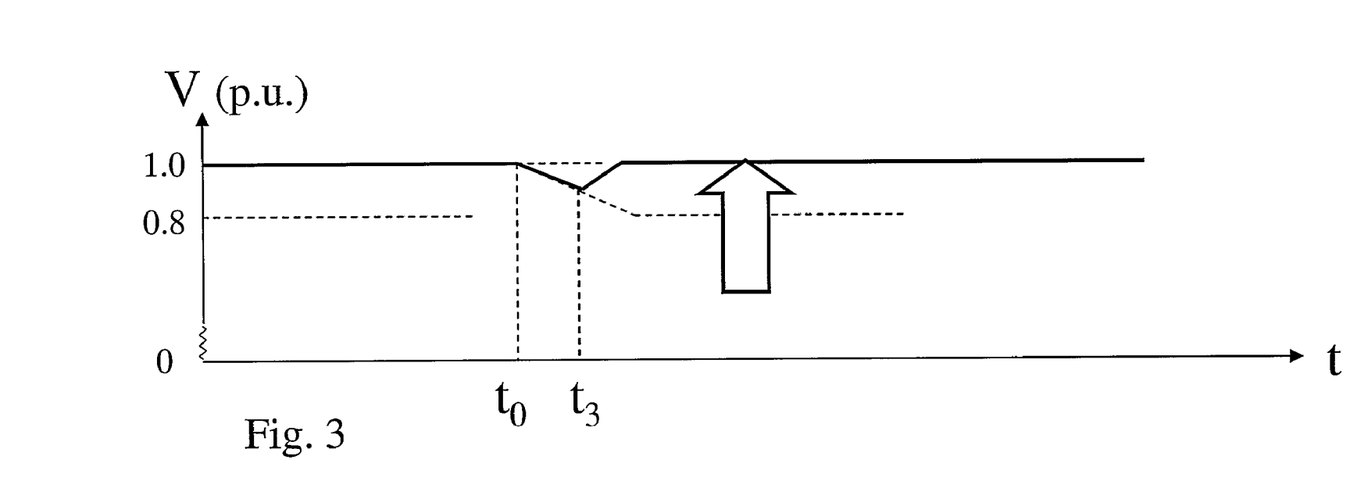
FIG. 3 is a diagram of voltage by time between the apparatus and the voltage raising means according to the invention.

In the diagram according to FIG. 3 the time event of the fault condition $t_0$ is the same but the diagram representing the voltage in the connection line 5a between the voltage raising means 6 and the apparatus 2. At a time $t_3$ just after the fault event $t_0$ the voltage raising means is activated and the voltage will raise to almost nominal. The protection devices of the apparatus sense no voltage drop and thus they will not trig. The apparatus is still connected during a first part of a fault condition which results in a respite for further decision making. The current will rush through the voltage raising means thus creating an increasing heat generation. Depending on the extent of the failure condition the respite will last longer or shorter. The effect thus achieved by the invention is shown by the arrow in the figure.

Figure 4:
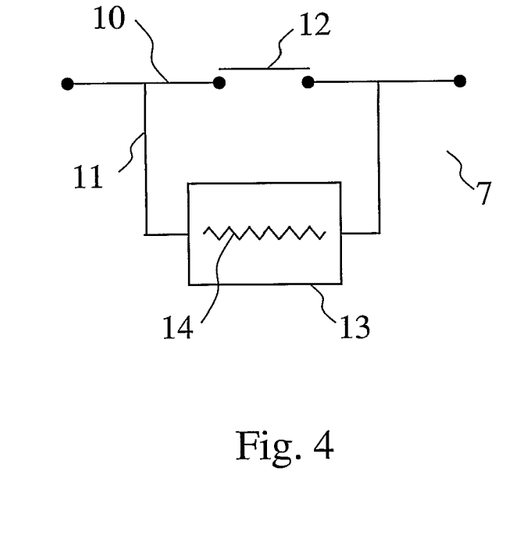
FIG. 4 is one embodiment of a voltage raising means.

A preferred embodiment of the voltage raising means 7 shown in FIG. 4. A first electric path 10 comprises a power switch 12. The switch is normally closed providing the current to flow through the first path without resistance. A second electric path 11 comprises a resisting means 13. In the embodiment shown in the figure the resisting means comprises a resistor element 14. It should, however, be understood that the resisting means may contain any element that produce resistance to a current flow. In presence of a fault condition in the network the power switch will open thereby diverting the current through the second path whereby the current will be experiencing a resistance thereby raising the voltage.

Figure 5:
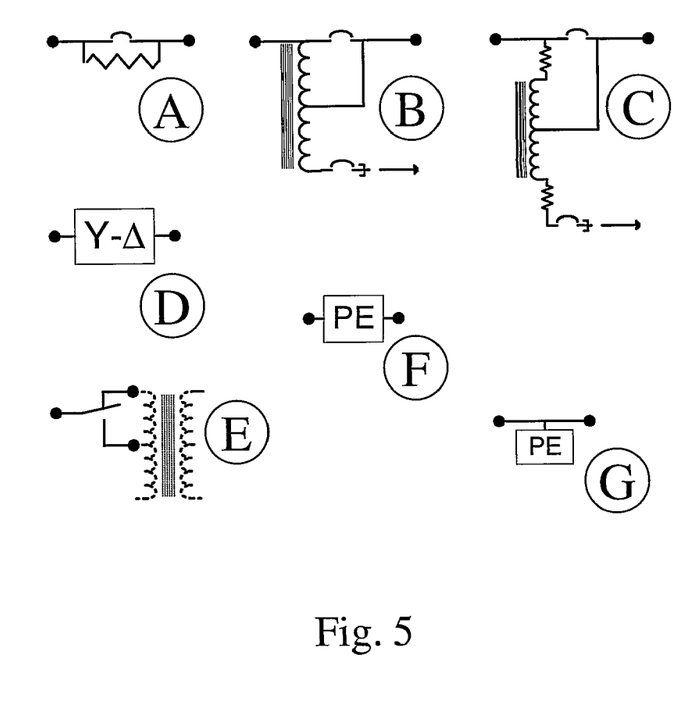
FIG. 5 is a plurality of embodiments of the voltage raising means.
Figure 6:
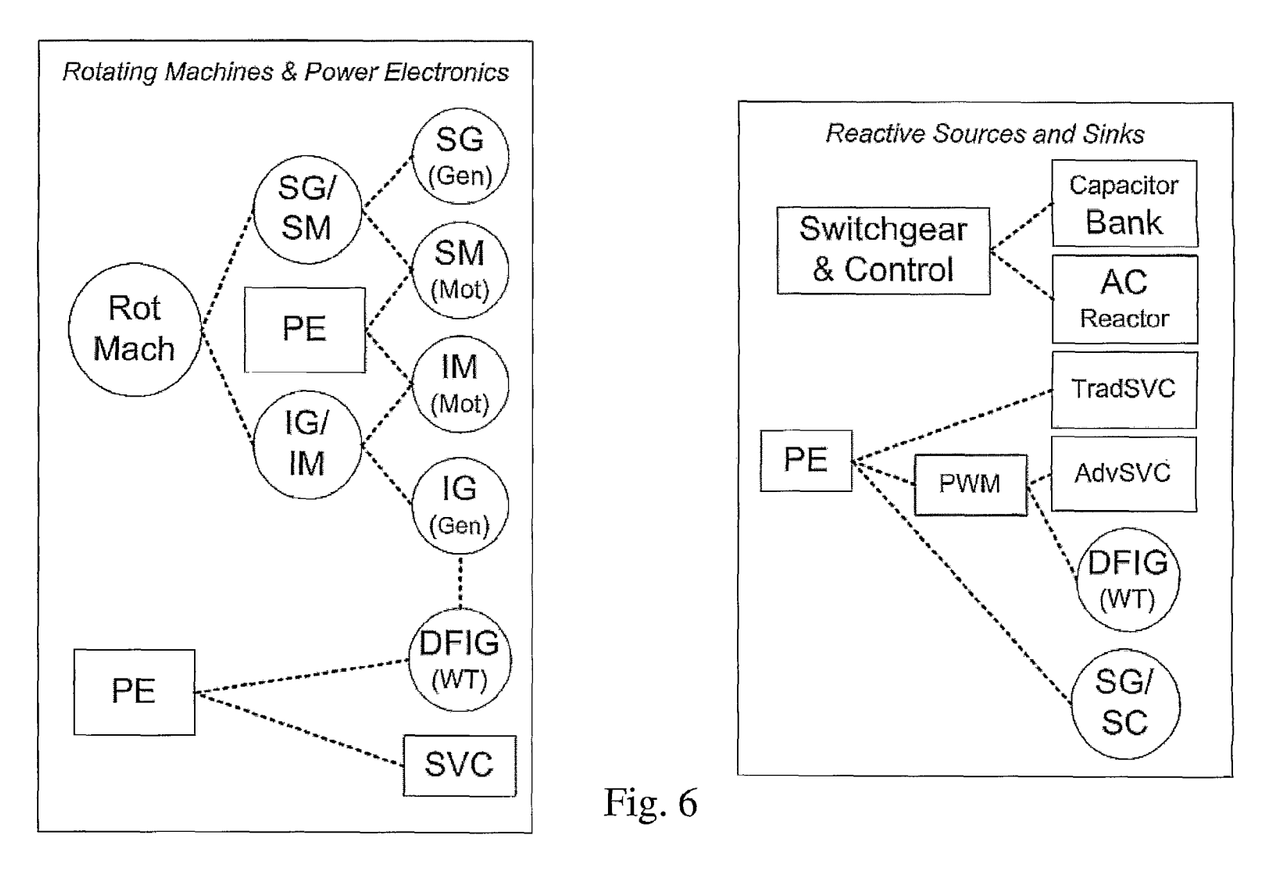
FIG. 6 is an overview of rotating machines, reactive sources and sinks, and power electronic converters.

The different embodiments of the voltage raising means according to FIG. 5 will by the drawing symbols be apparent to the person skilled in the art. The first embodiment A is a resistor and the second embodiment B is an autotransformer. C is an autotransformer with embedded resistors, D is Y-Δ coupling of the apparatus, E is a transformer, F is a series connected power electronic equipment and G is a power electronic equipment connected in parallel. The embodiment shown in FIG. 5 is only a few examples of embodiments for the understanding of the invention. FIG. 6 is an overview of rotating machines, reactive sources and sinks, and power electronic converters.

Figure 7:
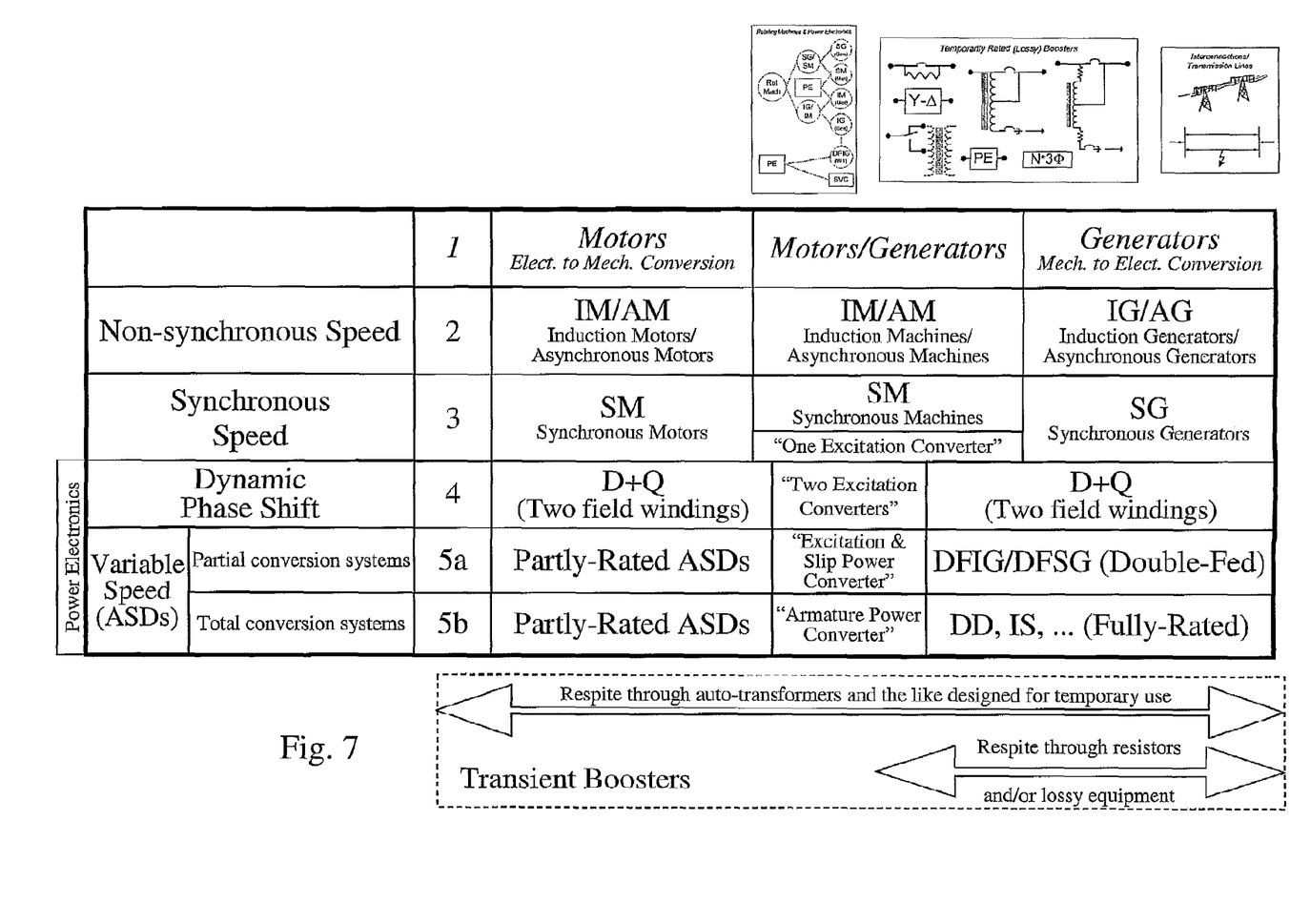
FIG. 7 is a table generalizing Rotating Machines and Power Electronic Converter Drive-trains for Improved—Speed/Phasor—Handling during Faults in Interconnection Grids.

A normally bypassed reactor/auto-transformer can be a physical realization to provide respite for motors and better motor drives' transient voltage stability, i.e., only the left side area of the table in FIG. 7. Such critical motor drives are, e.g., utilized as pump motors in power generation plants based on steam from fossil or nuclear fuel. Other such critical motor drives are fan motors in metal processes. An inventive step is to use boosters to stabilize motors.

A more costly physical realization is to embody a more costly "step-up" power transformer (which anyhow almost always is used as a fixed ratio transformer to adapt generator terminal voltage to interconnection terminal voltage) by temporarily affecting the turn ratio between the transformer's number of turns in its windings. A traditional nearby term is "power transformer with on-load tap-changers, PT with OLTC". The embodiment with a more costly power transformer comprises a larger change in turn ratios (than PT with traditional OLTC stepping within ±5 or 10%) to procreate a voltage increase from fault voltage level but increases the wind turbine cost with less than a percent which is paid back by better performance. Wind turbines possess already often, separate PT taps for generator and for power electronic converters, so, there is only a small increase in cost and complexity with the inventive step-up power transformer.

Another realization for both generators and motors is to embody the invention via a so-called Y-Δ connection.

It is well known to the person skilled in the art of rotating machines that there shall be no interruption of supply to keep transient stress down. So, Y-Δ connection, tap changing, reactor/auto-transformer, resistor, . . . realization should be embodied with uninterruptible or current-free contacting whereby that uninterruptible contacting for Y-Δ-connection is least known.

Power electronic controllers connected as shunt elements benefit from the described physical realization. They are preferably connected to generator terminals in wind turbines to achieve voltage boosting. When used for improved reactive power—sources & sinks—during faults in interconnection grids, they are only able to be boosted by normally bypassed reactors/auto-transformers or auto-transformers only, FIG. 7.

Active losses must be kept fairly low in case of reactive power—sources & sinks—only; the word "fairly" is used to point out that purely resistive resistors cannot be used to temporarily increase output from reactive power sources & sinks.

Figure 8:
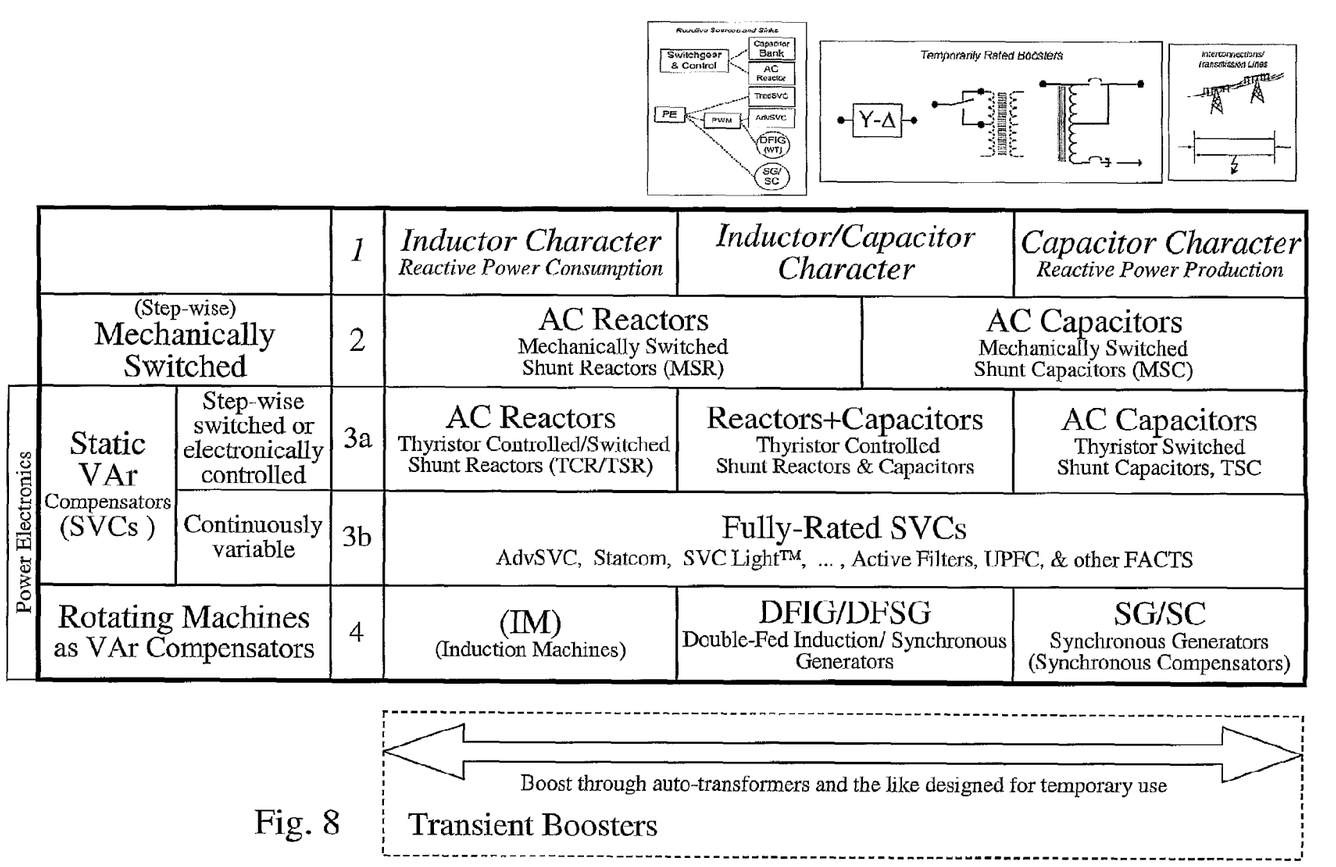
FIG. 8 is a table generalizing Rotating Machines, Electromechanics and Power Electronics for Improved Reactive Power Handling—Sources & Sinks—during Faults in Interconnection Grids.

Transient Boosters embedded in a Distributed Power Generation, DPG, systems sketched as a wind turbine park is shown left in FIG. 8. These transient boosters can be embedded between generators and step-up power transformers preferably at voltage levels nominally below, but not limited to, 1 kV. Transient boosters can also be embedded at collection voltage levels outside the step-up transformers. Combinations thereof might also be used as indicated in FIG. 8.

Figure 9:
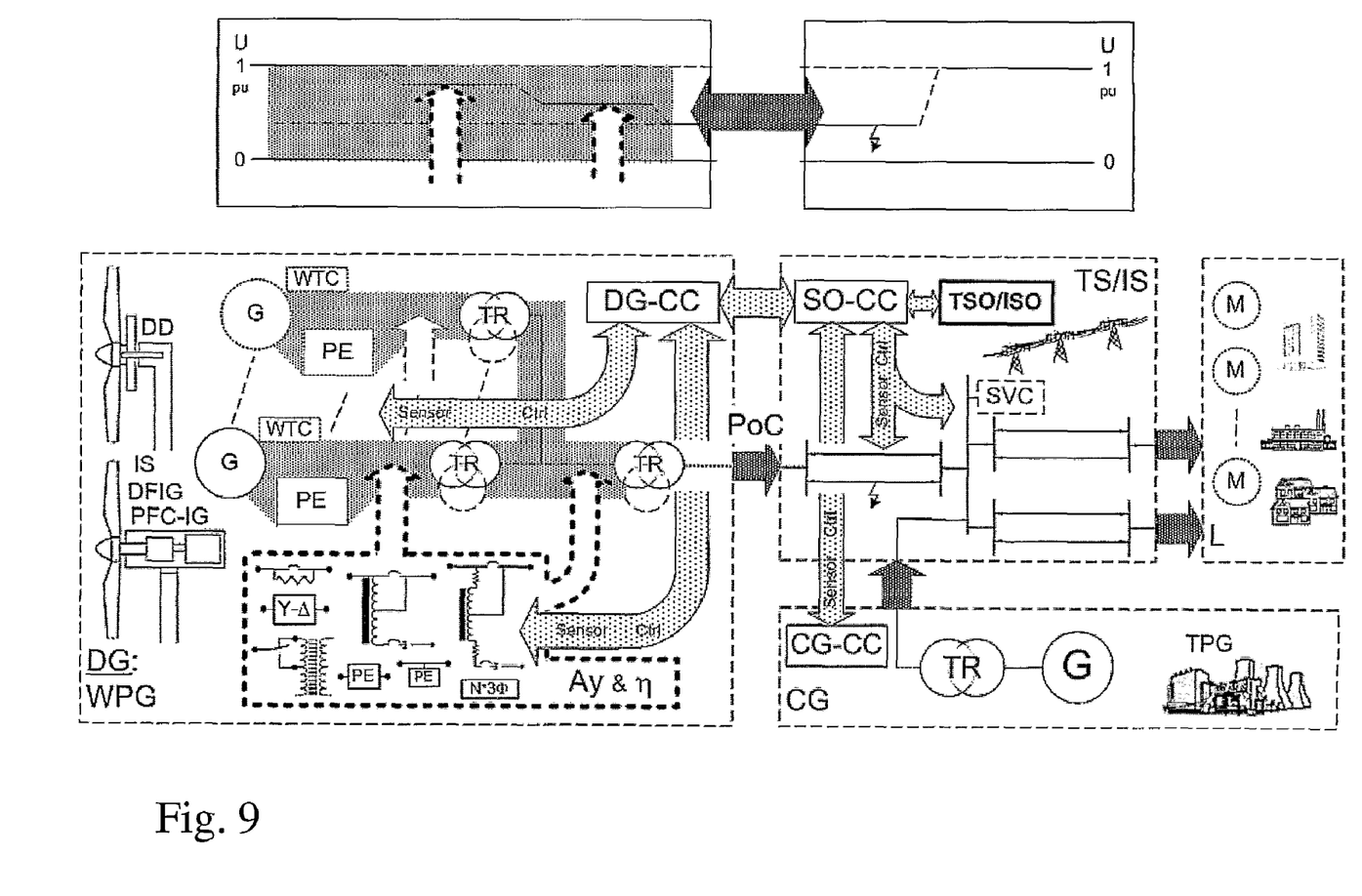
FIG. 9 is an overview of the art of wind turbine parks and interconnections for power collection and transmission showing a device according to the present invention and the communication with sensors and actuators in the network.

Increased phase numbers are sketched as N*3Φ in FIG. 9. It is beneficial to increase the number of phases as cost-effective low-voltage control and switchgear apparatuses as well as staff experienced to nominal voltage <1 kV can be employed for DPG systems above 3 to 4 MW. Two 3Φ systems share the load during normal operation while they support each other during non-symmetric faults when interconnected with ΔΦ=30° phase difference in rotating electric machines like generators and motors. The range of a N*3Φ system can be chosen arbitrarily to generator & step-up transformer only or to be extended to collection grid, too. This allows a DPG system designer to reduce a non-symmetric fault's negative-sequence component impacts, especially on mechanical drive-train components but also on electrical power system components, and can thus be seen as a part of the inventive idea of Transient Boosters.

Transient Boosters provide solutions for low cost wind turbine parks and their interconnections that handle a large amount of power, with highest availability and cost-effectiveness, without generating excessive amounts of heat during normal operation but easily refined into a cost effective design which utilizes temporarily rated components to increase the voltage in the vicinity of a wind turbine park with power engineering equipment like Rotating Machines, Power Compensators, and Power Electronic Converters.

Generalized, all rotating machines and power electronic converters can be temporarily adapted by a voltage booster component that increase the voltage in their vicinity during faults in neighboring interconnections. The voltage booster may be symmetrical or non-symmetrical.

As opposed to prior art and demands from power utilities, the invention increases the possibilities to keep the network as an entity as current is lowered and system voltage is increased.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the various embodiments are not intended to limit the scope of the claims which in themselves recite only those features regarded as essential to the invention.

The principal mode of operation is to react with transient boosters as soon as possible when a voltage level is falling outside its specification. All remedies that increases (terminal) voltages as soon as possible for respite are possible. As opposed to prior-art of wind turbines, active losses are cost-effectively utilized to improve system performance, a way that is not applied by those who see generators like motors but only with negative sign in the power equation. As opposed to prior-art of motor drives, reactive power sources & sinks as well as of generators, temporarily rated electromagnetic circuits are cost-efficient to overcome impact of low system voltage in especially power electronic converters.

The present invention also relates to apparatus for performing operations like communications, protection, sensing and control herein. This apparatus may be analogous or digital or both and especially constructed for the required purposes, or it may comprise a general purpose computer selectively activated or reconfigured by a computer program stored in the computer. Such a computer program may be stored in a computer readable storage medium, any type of media suitable for storing electronic instructions, and each coupled to a computer system bus. The principles and layouts presented herein are not inherently related to any particular computer or other apparatus. Various general purpose machines may be used with programs in accordance with the teachings herein, or it may prove convenient to construct more specialized apparatus to perform the required method steps. The required structure for a variety of these machines for communications, protection, sensing and control, etc. is not a part of the invention. In addition, the present invention is not described with reference to any particular programming language.

Figure 10:
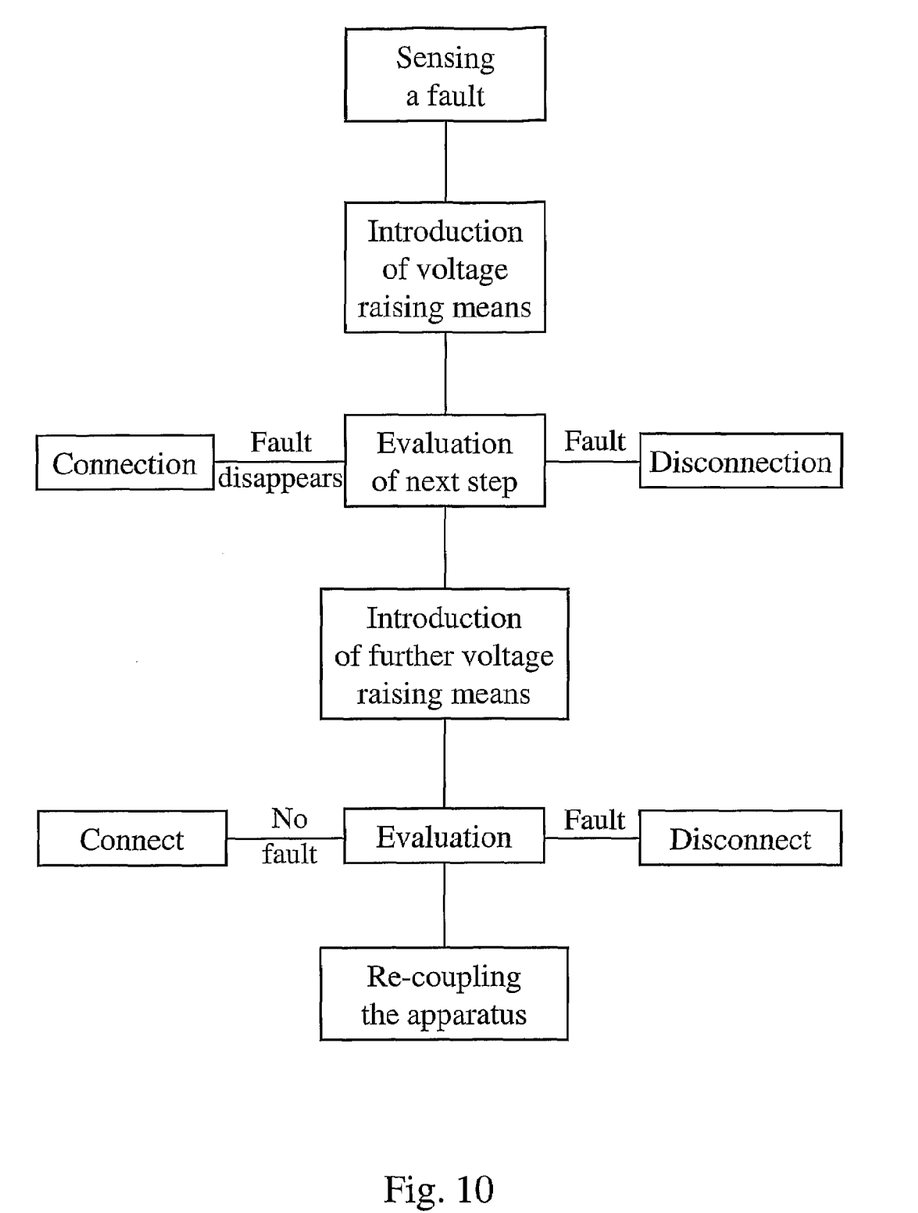
FIG. 10 is a layout of the principle of a computer program product for processing sensed data, for evaluations of actions to be taken and for affecting a current diversion means.

In FIG. 10 a block scheme of a computer program is shown. The computer program will perform the method described by exercising the program on a computer means containing memory means. On sensing a fault condition from a distant sensor in the network the computer program immediately diverts the current in the in the connection between an apparatus and a grid point to affect a voltage raise in the connection. In one embodiment this is effected by introducing a resisting means in the current flow. The current diversion will cause that the apparatus will still be in operation, however, at a reduced rate. This will create a respite for the evaluation of the fault situation and for a decision on a next action to perform. Thus a first period of time is created for this evaluation. At the end of this first period of time an action is effected starting a second period of time, following the first period of time for a second evaluation and decision respite. During each respite it may appear that the fault condition has disappeared. In such case the current is diverted back to a normal condition. In other cases the fault condition may be severe which indicate a situation of safety measures. In such a case the main switchgear will open the circuit to disconnect the apparatus. In yet a third case the fault condition may temporary but not severe. In such a case the second respite may result in rearrangement of the circuit. There may be for instance a possibility to rearrange the Y-Δ connection.

It will be appreciated that a variety of programming languages may be used to implement the teachings of the invention as described herein.

The invention claimed is:

1. A device for controlling at a fault condition an apparatus connected by a connection line to a grid point of a transmission net in an electric power network, the device comprising:
a voltage raising element connected in series with the apparatus, the voltage raising element comprising a first branch connected to the grid point comprising a power switch and a second branch comprising a current resisting element connected in parallel with the power switch, the voltage raising element further comprising a processor for signal processing of a sensed fault condition comprising reduced voltage on the network and for opening the power switch such that on sensing a fault condition at least part of the current is diverted through the voltage raising element, thereby raising the voltage between the apparatus and the grid point and maintaining the apparatus connected to the grid point for evaluation of further actions while the power network is still in operational condition.

2. The device according to claim 1, wherein the switch comprises a power switch for diverting the current to the second branch.

3. The device according to claim 1, wherein the current resisting element comprises a resistor element.

4. The device according to claim 1, wherein the current resisting element comprises an autotransformer.

5. The device according to claim 1, wherein the processor comprises a memory element.

6. An electric power network, comprising:
a first apparatus,
a transmission net,
a second apparatus,
a connection line operative to connect the first apparatus and the second apparatus a grid point of the transmission net, the connection line comprising a control device a voltage raising element comprising a first branch including a switch, and the voltage raising element further comprising a second branch comprising a voltage raising element, whereby the switch in an open position diverts the current into the second branch, thereby raising the voltage between the first apparatus and the second apparatus and the grid point and maintaining the first apparatus and the second apparatus connected to the grid point for evaluation of further actions while the power network is still in operational condition.

7. The electric power network according to claim 6, wherein the control device further comprises a processor for signal processing of a sensed fault condition comprising reduced voltage on the network and for opening the power switch upon on sensing a fault condition.

8. The electric power network according to claim 6, further comprising:
a sensor configured to sense a fault condition on the net.

9. The electric power network according to claim 6, further comprising:
a communication network configured to exchange signals among the control device, sensors and actuators.

10. A method for controlling at a fault condition an apparatus connected by a connection line to a grid point of a transmission net in an electric power network, the method comprising:
sensing the fault condition,
introducing a first operational condition for the apparatus under a first period of time, the first operational condition comprising a raised resistance between the apparatus and the grid point,
evaluating during the first period of time a second operational condition to be introduced, and
introducing the second operational condition starting a second period of time for further evaluation of conditions to be introduced.

11. The method according to claim 10, wherein the first operational condition comprises the diversion of current to pass a voltage raising means.

12. A computer program product, comprising:
a computer readable medium; and
computer program instructions recorded on the computer readable medium and executable by a processor to perform the steps of sensing a fault condition, introducing a first operational condition for an apparatus under a first period of time, the first operational condition comprising a raised resistance between the apparatus and the grid point.

evaluating during the first period of time a second operational condition to be introduced, and introducing the second operational condition starting a second period of time for further evaluation of conditions to be introduced.

13. The computer program product according to claim 10, wherein the computer program instructions are further for providing the computer program instructions at least in part over a network.

14. The computer program product according to claim 13, wherein the network comprises the internet.

15. The device according to claim 1, wherein the apparatus connected to the electric power network comprises a wind turbine.

* * * * *